July 5, 1960 W. R. JOHNSON 2,944,107

APPARATUS FOR WAVE-BAND DIVISION

Filed April 23, 1956 4 Sheets-Sheet 1

INVENTOR.
WAYNE R. JOHNSON
BY
Lippincott & Smith
ATTORNEYS

July 5, 1960 W. R. JOHNSON 2,944,107

APPARATUS FOR WAVE-BAND DIVISION

Filed April 23, 1956 4 Sheets-Sheet 2

INVENTOR.
WAYNE R. JOHNSON
BY
Lippincott & Smith
ATTORNEYS

July 5, 1960 W. R. JOHNSON 2,944,107

APPARATUS FOR WAVE-BAND DIVISION

Filed April 23, 1956 4 Sheets-Sheet 3

INVENTOR.
WAYNE R. JOHNSON

BY Lippincott & Smith.
ATTORNEYS

July 5, 1960 W. R. JOHNSON 2,944,107

APPARATUS FOR WAVE-BAND DIVISION

Filed April 23, 1956 4 Sheets-Sheet 4

INVENTOR.
WAYNE R. JOHNSON

BY Lippincott & Smith
ATTORNEYS

United States Patent Office 2,944,107

Patented July 5, 1960

2,944,107

APPARATUS FOR WAVE-BAND DIVISION

Wayne R. Johnson, Los Angeles, Calif., assignor, by mesne assignments, to Minnesota Mining & Manufacturing Co., St. Paul, Minn., a corporation of Delaware Filed Apr. 23, 1956, Ser. No. 580,064

18 Claims. (Cl. 178—6.6)

This invention relates to methods and apparatus for splitting signals having components occupying a wide band of frequencies into a plurality of narrower bands, and later re-combining the resultant narrower bands to reconstitute substantially the original frequency spectrum.

Among the objects of the present invention are to provide a means and method of band-splitting and re-combination which is applicable to the magnetic recording of television signals; to provide such a method which does not depend upon heterodyning, in the ordinary sense, wherein the frequency and phase of a constant carrier frequency must be accurately reproduced in playing back the recorded signals; to provide a method of frequency-shifting high-frequency signals wherein the signals so shifted supply, in effect, their own "carrier" frequencies; to provide a method of frequency-shifting high-frequency signals in recording and reproduction which will restore in the reproduction the rapid rise-times necessary for the reproduction of such signals in sharp detail; and to provide apparatus that is readily and simply realizable and which will carry out the steps of the method thus described.

In accordance with the present invention any frequencies which are not to be shifted are separated from those which are to be shifted to a lower band. Since for television purposes this separation should be accomplished without phase-shifting the resultant signals, the separation is preferably accomplished by dividing the signals into two channels, passing the signals from one channel through a low-pass filter which removes from that channel all signals of the frequencies which are to be shifted, and, in effect, subtracting the lower-frequency signals from the entire band as passed into the first channel, this method being preferred because it is relatively easy to construct low-pass filters without phase shift, whereas high-pass filters, which would accomplish the elimination of the low-frequency directly, almost always introduce shifts of phase.

The method of the present invention is not limited by the nature of the preliminary steps thus far described. Whatever the signals operated upon may be, they are passed into two parallel channels. In the first channel they are amplified to any necessary degree, passed through a delay-line, if necessary, to compensate for any delay the signals in the second channel may be subjected to in the operations later to be described, and then again divided into parallel sub-channels, each of which includes a double-balanced modulator, the output of which supplies a recording head or transducer. For convenience these sub-channels may be referred to as the "sine channel" and "cosine" channel respectively.

The signals in the second channel are also divided into sine and cosine sub-channels, but in a different manner. Here the signals are supplied to a full wave rectifier circuit, so arranged that the "positive" halves of the signal are supplied to the sine channel and the "negative" halves to the cosine channel. Except that they operate on different halves of the signal the sine and cosine channels are identical, and the description of one will serve for both.

Considering the sine channel, the signals supplied to it are preferably first amplified and then limited, to provide substantially rectangular waves of uniform amplitude, having the same period as that of the half-waves in the sine channel, and are then supplied to a 2:1 frequency divider or binary counter. A differentiating network may be interposed between the limiter and the binary counter to further steepen the wavefronts and trigger the counter more accurately. The result in either case is a second train of rectangular waveforms the periods whereof are on the average twice those of the pulses in the wave train supplied to the input of the frequency divider. This latter wave train is again differentiated to provide a series of sharp pulses, occurring at each reversal of the half frequency (or double period) wave from the frequency divider. These pulses are supplied to the second input circuit of the double-balanced modulator in the sine sub-channel of the channel first described.

The double-balanced modulator delivers an output only when potentials are applied to both input circuits. Pulses are supplied to the second input of the sine channel modulator only during the "positive" half cycles of the signals to be recorded, but the pulses alternate in polarity, so that, in the output of the modulator the "positive" half-cycles alternate in polarity; i.e., the frequencies represented are divided by two.

In the cosine channel the same operations take place, but here the pulses supplied to the second input of the modulator occur simultaneously with the "negative" halves of the input signals. The signals recorded attain their maximum amplitude 90 degrees out of phase with those in the sine channel, justifying the "sine" and "cosine" designations. These designations are, of course, arbitrary, as are the "positive" and "negative" designations of the polarity of the original signal. As indicated above the signals from the sine and cosine channels are recorded on separate tracks.

In reproduction the signals played back from the two tracks are operated upon in identical fashion and hence a single description will again suffice for both. As in the case of the recording, the preferable method of reproduction involves again dividing the played-back signals into two channels. The first of these channels supplies one input of a double-balanced modulator. In the second of the playback channels the signal is amplified and limited to produce a train of substantially square pulses, changing in sign with each change in polarity of the reproduced signals. These pulses are then preferably passed through a low-pass filter, which removes frequency components above the cutoff frequency of the reproduced band, resulting in a train of constant-amplitude signals of approximately sinusoidal waveform, which are supplied to the second input of the double-balanced modulator. Resultant sidebands comprise effectively a direct current component plus a double frequency component, the result being effectively a train of signals occupying the entire band which was originally split, but omitting a portion of the information comprised in that band. The missing information is, however, included in the signals reproduced from the cosine channel.

The low frequency signals which were removed from the over-all band as the first step above described are recorded on a separate track and added to those developed from the sine and cosine channels to reconstruct the entire signal.

A somewhat less desirable mode of reproduction of the recorded signal has the advantage of avoiding the use of two channels to split the signal which is supplied to the modulator. In accordance with this modification of the method the signal from each single reproducing channel is supplied to a full-wave rectifier. This, in itself, is effectively a modulation of the signal upon its own frequency, resulting in D.C. and double frequency components, as does the modulation process first described. It results in the same frequency components, broadly speaking, as does the modulation of the reproduced signals through the two channel arrangement, but the last-mentioned method gives better waveforms and less distortion. If, because of the simpler instrumentation, the rectification method of intermodulation is used the signal is treated after the full wave rectification process in the same manner as has already been described.

The detailed description of the invention and of apparatus adapted to carry it out which follows is illustrated by the accompanying drawings, wherein.

Figure 3A:
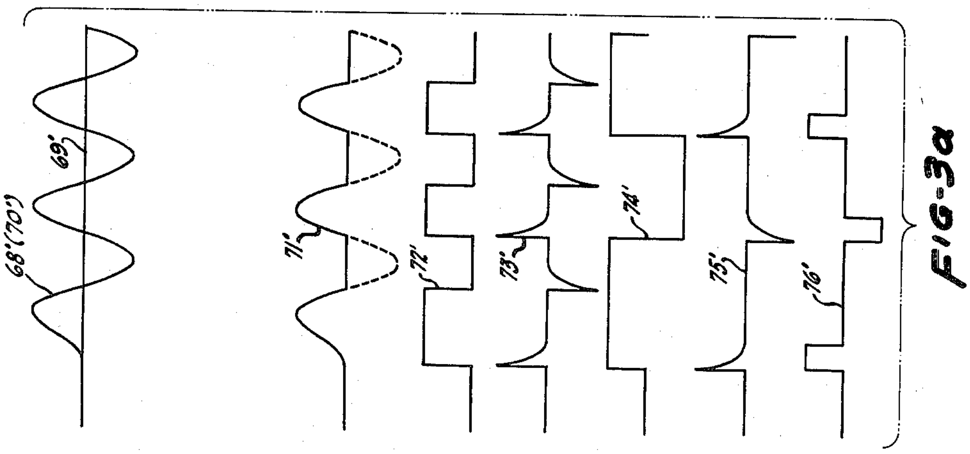
Fig. 3 is a diagram illustrating the waveforms developed in frequency shifting the high-frequency component of a rectangular pulse of relatively long duration, preparatory to recording.
Figure 4A:
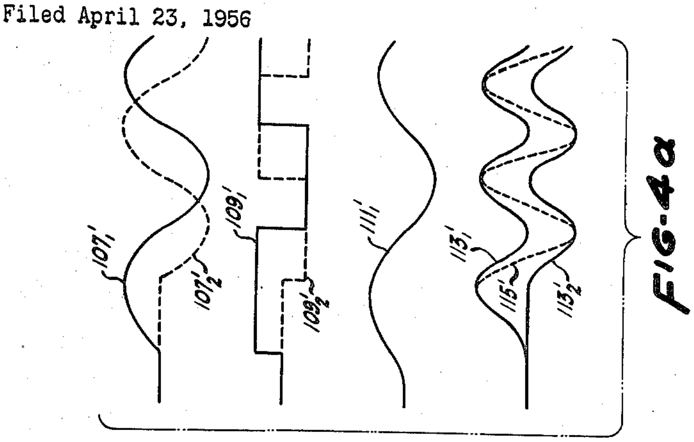
Figure 4:
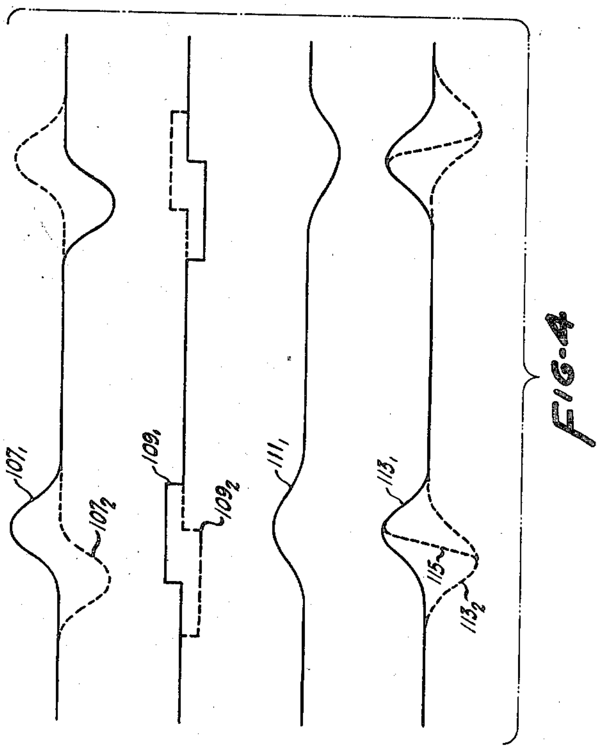

Fig. 3*a* is a similar diagram illustrating the waveforms developed in frequency-shifting a continuous sine wave;

Fig. 4 is a diagram illustrating the waveforms developed in the reproducing equipment in the various steps of restoring the high frequencies components of a square wave to their initial frequencies; and Fig. 4*a* is a similar diagram illustrating the waveforms developed in reproducing a continuous high frequency wave.

Figure 1:
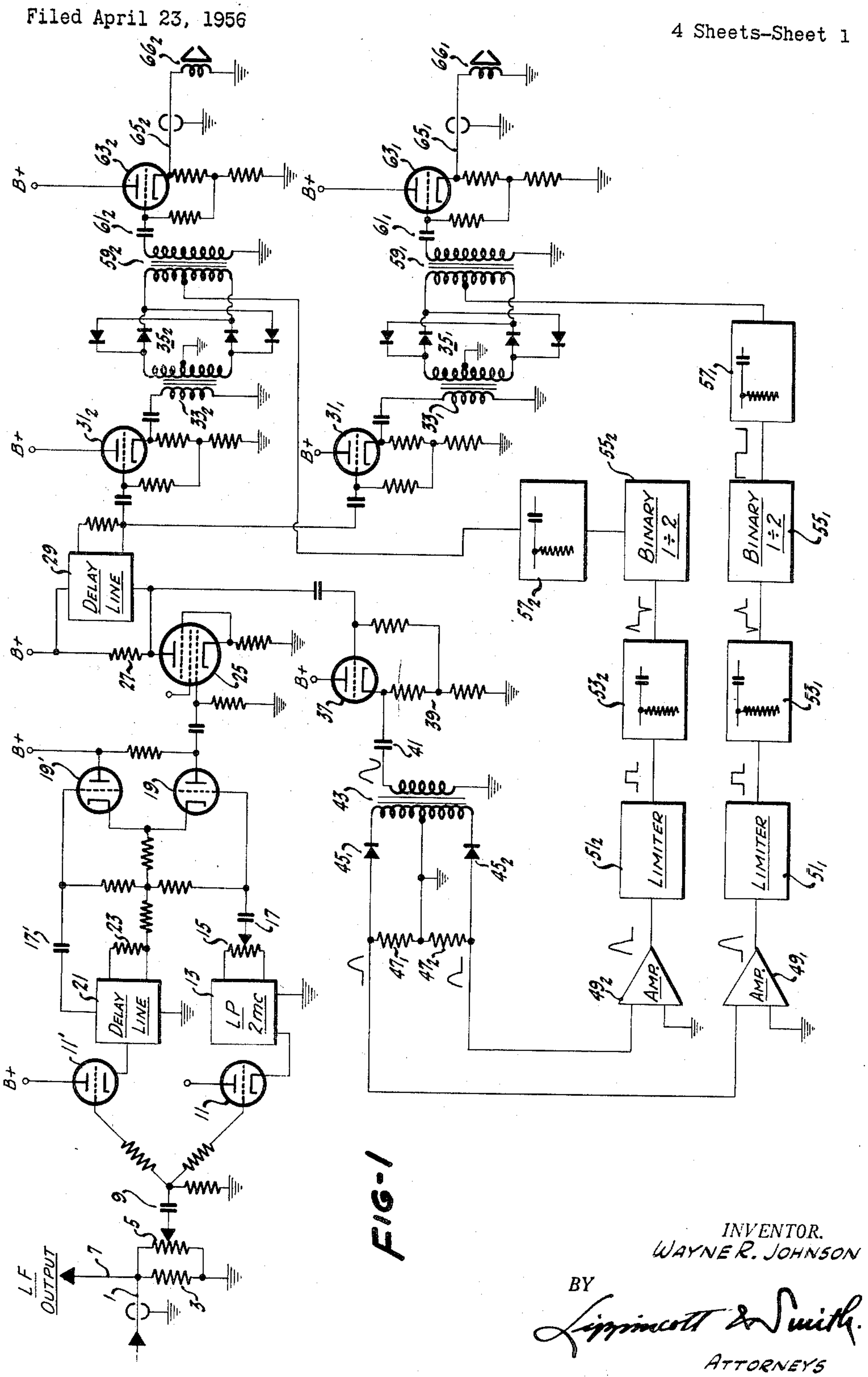
Fig. 1 is a circuit diagram, partly schematic and partly in block form, of band splitting equipment adapted to be used in the recording of the high frequency components only of television signals.

The apparatus schematically shown in Fig. 1 is that adapted to effect the method of this invention in the recording of the high-frequency components of a television signal wherein the picture frequencies extend from a very low value, such as the 60-cycle frame frequency, up to approximately 4 mc., this being the width of a television channel under present standards of transmission in the United States. It is assumed that the high frequency cutoff of the recording and reproducing apparatus is one-half the channel width, i.e., 2 mc.

The entire picture signal, including blanking pulses, is supplied to the equipment through a coaxial cable 1, in accordance with conventional practice. The cable is terminated in its characteristic impedance by a resistor 3, bridged by a potentiometer 5 which serves as a gain-control for the high frequency components.

The entire signal is taken off across the cable termination through a lead 7 and supplied to the recording transducer for the low frequency track. The low frequency channel supplied by lead 7 will include suitable amplifiers and delay lines to match the phase of the signal recorded through it with those which are operated upon by the equipment here to be described in detail. The high frequency components of the signals through this low-frequency channel will be removed, without phase distortion, owing to the high frequency cutoff of the reproducing equipment and since the operation is entirely conventional it need not be described here.

The entire frequency band from which the high frequencies are to be abstracted and operated upon is picked off of the potentiometer 5 and supplied, through a blocking condenser 9, to a pair of cathode-follower amplifiers 11 and 11'. These two tubes are supplied in conventional manner with suitable anode potentials from a source not shown, which also provides operating potentials for other amplifiers later to be described. The usual grid biasing and stabilizing resistors are shown, but in connection with these and with the other amplifiers entering into the circuits they need not be identified by individual reference characters since their connections will be readily understood, without specific description, by those skilled in the art.

A low pass filter 13 is connected in the cathode circuit of amplifier tube 11. This filter should be of the Gaussian type, having a sharp cut off, corresponding substantially to that of the recording and reproducing equipment in the low frequency channel, and without phase distortion. The filter 13 is terminated in its characteristic impedance by a gain-control potentiometer 15, and its low-frequency output connects through a blocking condenser 17 to the control electrode of one-half, 19, of a differential amplifier.

The cathode circuit of amplifier 11' comprises a delay line 21, the impedance whereof is matched to the input impedance of filter 13. Delay line 21 is preferably of the adjustable type, so that its delay can be matched accurately with that of the low pass filter 13. It is terminated in its characteristic impedance by a resistor 23. Its output, comprising the entire signal as delivered from the line 1, is supplied through a blocking condenser 17' to the other half 19' of the differential amplifier. In accordance with the well known properties of such amplifiers, the voltage appearing at the anode of the amplifier section 19 is proportional to the dfference in the voltages applied to the grids of the two tubes. By proper adjustment of the gain control 15 the low-frequency components of the signals applied to the grids of the two tubes may be made accurately equal. Since no high-frequency components appear on the grid of tube 19, but do appear on the grid of tube 19', the high frequency components are not cancelled out. The arrangement is thus the equivalent of a high-pass filter, but one without the phase distortions which, in high-pass filters, are practically impossible to avoid, particularly in the neighborhood of the cutoff.

The output from the dfferential amplifier, comprising only the frequencies above 2 mc., are applied to the grid of an amplifier 25, in this case a pentode. The amplified voltage, as developed across the anode resistor 27 of tube 25, is supplied to two parallel channels. The first of these channels includes a delay line 29 which compensates for the delay of signals passed through the apparatus in the other channel.

From the output of delay line 29, the circuit again divides into two identical sub-channels. One of these channels, the sine channel, connects first to the grid of a cathode-follower isolating amplifier $31_1$. The output of this amplifier supplies the input transformer $33_1$ of a double-balanced modulator of conventional type, identified by the general reference character $35_1$. The equipment in the cosine channel, being identical, is identified in the drawing by the same reference characters bearing the subscript 2.

The second inputs to balanced modulators $35_1$ and $35_2$ are supplied from a branch circuit taking off from the anode of tube 25 ahead of the delay line 29. Signals in this channel are applied to the grid of a cathode-follower isolating amplifier 37. The cathode resistor 39 of amplifier 37 connects through a blocking condenser 41 to the primary winding of a transformer 43.

The secondary of transformer 43 is provided with a grounded center tap. The two outer terminals of the secondary connect through rectifiers $45_1$ and $45_2$, respectively, to shunt resistors $47_1$ and $47_2$, each connecting to ground. The two rectifiers are poled in the same direction with respect to the secondary winding, so that each passes a series of unidirectional pulses, each pulse representing one-half of the input wave, all the pulses being of the same polarity. Each train of pulses supplies a separate circuit; the two circuits are identical in construction, and the same reference characters, distinguished by the subscripts 1 and 2 respectively are applied to the elements thereof.

Choosing for particular description the circuit connected to rectifier $45_1$, the unidirectional, half-cycle pulses are applied to the input of a high gain amplifier $49_1$. The amplified pulses are passed through a limiter or clipping circuit $51_1$ which converts the pulses, originally of approximately half-sine waveform, into a train of substantially square waveform waves, representing, cycle for cycle, the high frequency components of the signals which are also supplied to the delay line 29. These signals next are passed through a differentiating circuit, as indicated by the symbol on the block $53_1$ before being applied to the input circuit of a 2:1 frequency divider $55_1$. The differentiating circuit $53_1$ serves to steepen the wave fronts of the square waveforms supplied to the frequency divider, giving sharp triggering pulses to actuate the latter.

The frequency divider is preferably the type known, variously, as a "flip-flop," Eccles-Jordan, or bistable multivibrator circuit. There are various types of such circuits; the type here used is one which will be triggered only by pulses going in one direction, which may be either positive or negative, depending upon the particular modification used. The output of such a device consists in a train of rectangular waves, changing in polarity with every alternate change of polarity of the waves comprising the high frequency band to be divided. Stated differently, and somewhat loosely, the fundamental frequency of the pulses in the ouput of the divider is one-half of that of the waves in the high frequency channel, the looseness of the statement being due to the fact that these waves and the corresponding pulses may be of varying lengths so that the assignment to them of a specific frequency is not theoretically justified. Owing to the fact, however, that frequency components below 2 mc. have been filtered out of the band, and that, due to the limitation of channel width of the television signals the band operated upon has no frequencies above 4 mc., it follows that in the train of pulses in the output of the divider there will be no complete cycle, comprising a positive and negative pulse, having a period shorter than one-half microsecond or longer than one microsecond. Furthermore, there will be an alternation of polarity of the pulse train for every alternate reversal of polarity in the high-frequency signal train.

As suggested above, the signals in the pulse channel will be subjected to some delay in the amplifier $49_1$, limiter $51_1$, and the triggering of the binary frequency divider $55_1$. Delay line 29 is adjusted so that as the signals passing through it appear in the input circuit of the balanced modulator $35_1$, the reversals of polarity in the pulse train coincide with the reversals of polarity in the signals of the high-frequency band. The half-frequency pulse train is supplied to a pulse-forming network $57_1$. This includes at least a differentiating circuit, as indicated by the symbol on the block, and may include additional elements to cause it to develop substantially rectangular pulses whose length approximates a half-period of the cut-off frequency of the apparatus at most. These pulses, alternating in sign, are supplied to the second input circuit of modulator $35_1$, where they are intermodulated with the "positive" half cycles of the signals from the amplifier $31_1$. Since these pulses occur only during such "positive" half cycles they are, in effect, sampling pulses; since they alternate in sign the resultant samples also alternate, with the result that the recorded frequencies are effectively divided by two.

The output transformer $59_1$ of modulator $35_1$ connects through a condenser $61_1$ to the input of a cathode follower tube $63_1$ and the latter in turn, has an output impedance matched to that of a coaxial line $65_1$ which supplies a transducer head $66_1$ for recording the "sine component" of the high frequency band.

The channel whose elements are distinguished by subscripts 2 connects in exactly the same manner to modulator $35_2$ and thence to the following equipment feeding the cosine channel output $65_2$.

The signals in the two output circuits $65_1$ and $65_2$ are similar in character but not identical. The pulse trains fed to each of the two modulators each change in polarity with every alternate change in polarity of the signals in the high-frequency band, but the two pulse trains are out of step, so that when the signal in the sine channel changes from positive to negative (say) the pulse train modulating that channel changes in polarity but that supplied to the cosine channel does not, while when the signal train changes polarity from negative to positive the reverse is the case with respect to the two channels.

As a result of the operations in each channel a number of modulation products are produced in the output circuits. The major component in these modulation products, and the only one which is reproduced at an appreciable level, is a difference-frequency component, and this is always one-half the initial frequency. If there is a period during which a 4 megacycle frequency is dominant in the signals to be recorded, the dominant frequency in the output of the modulator is 4/2=2 mc., which is, by postulate, the cutoff frequency of the reproducing equipment. If the frequency to be recorded is that of the low-frequency cutoff of the input channel, i.e., 2 mc., the reproduced frequency is equal to 2/2=1 mc. The term "frequency" as here used does not, it should be realized, refer to steady state or quasi-steady state Fourier components, but to cycles, single or repeating, whose periods correspond to those of the frequencies referred to.

Figure 3:
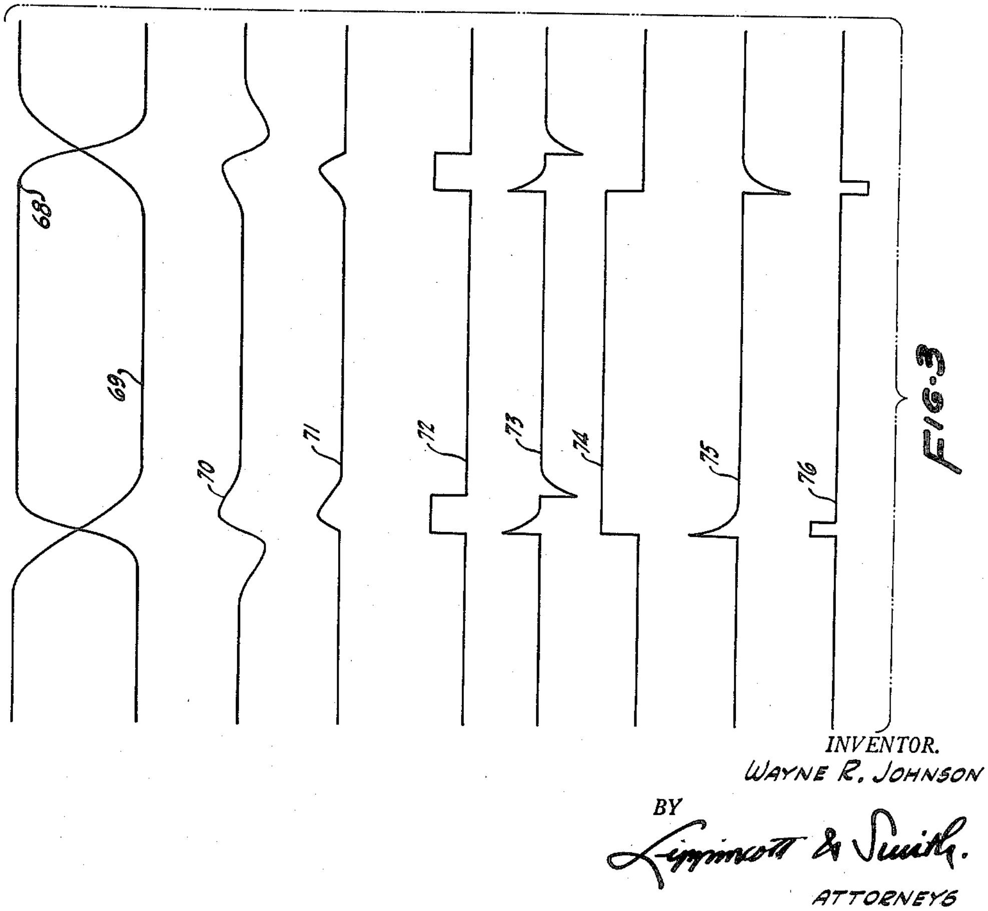

The nature of the over-all operation, as applied to a single, rectangular pulse of sufficient duration for the high frequency components of the initial transient to die out before the end of the pulse, is illustrated in the curves of Fig. 3. In this figure the original pulse, containing frequency components up to 4 mc., is indicated by cure 68. This is the pulse applied to the grid of tube 19'. The same pulse, but with the frequencies above 2 mc. removed by the Gaussian filter 13, and inverted to indicate the subtraction that occurs in the differential amplifier, is indicated by curve 69. The wave forms resulting from the subtraction, as they appear across the output of the differential amplifier, is shown in curve 70.

Rectifier $45_1$ selects the positive halves of the waveforms of curve 70, resulting in the curve 71, and after large amplification in amplifier $49_1$ and clipping in limiter $51_1$ the result is a series of nearly rectangular pulses, having very short rise times, as indicated by curve 72. The rise times of the pulses of curve 72 are shortened still further by circuit $53_1$, resulting in the short-pulse waveform indicated in curve 73. The binary counter, $55_1$, triggers on the initial or positive going pulses of the curve 73, with a resultant output wave like that of curve 74.

The rectangular waveform of curve 74 is in turn differentiated, to give a waveform similar to that shown in curve 75. Further wave shaping to give rectangular, uniform pulses such as are shown in curve 76 is desirable, but not necessary. Such wave shaping and the networks used to accomplish it are well known in the radar art, and since the shaping is not essential the networks to accomplish it are omitted for the sake of simplicity.

The sampling pulses developed as shown in curve 76 are intermodulated with the curve indicated in curve 70. All of the curves of Fig. 3 are alined horizontally with respect to the same time scale. By projecting the pulses shown on curve 76 upward to curve 70 it will be seen that the pulses correspond with the positive half-waves of the upper curve. The first pulse shown on curve 76 is positive, and since it coincides with a positive half wave of curve 70 the output resulting from intermodulation will also be positive. The second pulse is negative and intermodulated with the positive half-wave of curve 70 the result is a negative pulse. These pulses will be recorded and reproduced, but because of the cut-off characteristics of the reproducing equipment they will be reproduced as pulses having a substantially sine-wave form and a period equal to that of one cycle of the cut off frequency. Such pulses, and the way that they are operated upon, are indicated in Fig. 4 and will be discussed following the description of the reproducing equipment used in accordance with the present invention.

Fig. 3*a* shows the waveforms resulting from the successive steps of the operations above described upon a continuous wave at the highest frequency to be operated upon, i.e., at the top of the band. The curves representing the waveforms of each successive step are designated by the same reference characters as those representative of like steps in the case of the reproduction of a rectangular pulse, the reference characters referring to the steady state being, however, distinguished by accents. It should not be necessary, therefore, to repeat the description. It need only be noted that since the filter 13 passes no components of the continuous wave to be recorded the component 69′, subtracted from the initial wave, is zero. Curves 68′ and 70′ therefore have the same form and in the drawing a single curve represents both and carries both reference characters.

The final output of the modulator, representing the frequencies that are recorded consists of a wave in which each alternate cycle is inverted in phase; i.e., the wave supplied to the recording transducer head comprises two positive half cycles followed by two negative half cycles, and then repeats. The major components of such a wave comprise a fundamental of one-half the original frequency and its third harmonic, one and one-half times the original frequency. By postulate the fundamental frequency is at the upper cut-off of the recording-reproducing apparatus. The third harmonic of this fundamental is far above the cut-off and will not reproduce.

If the continuous wave of curve 68′ were at 2 mc., the lower end of the high frequency band instead of 4 mc., i.e., at the cross-over frequency of the Gaussian filter 13, it would appear in the output of the filter at half amplitude and therefore also at half amplitude in the output curve 70 but otherwise, following the output of the differential amplifier, the waveforms would be the same. The major components in the output of the amplifier would represent frequencies of 1 mc. and 3 mc. Since the latter frequency is well above the assumed cut-off of the reproducing equipment it would be eliminated in reproduction in the same manner as in the case of a continuous wave at the upper end of the frequency-shifted band.

Figure 2:
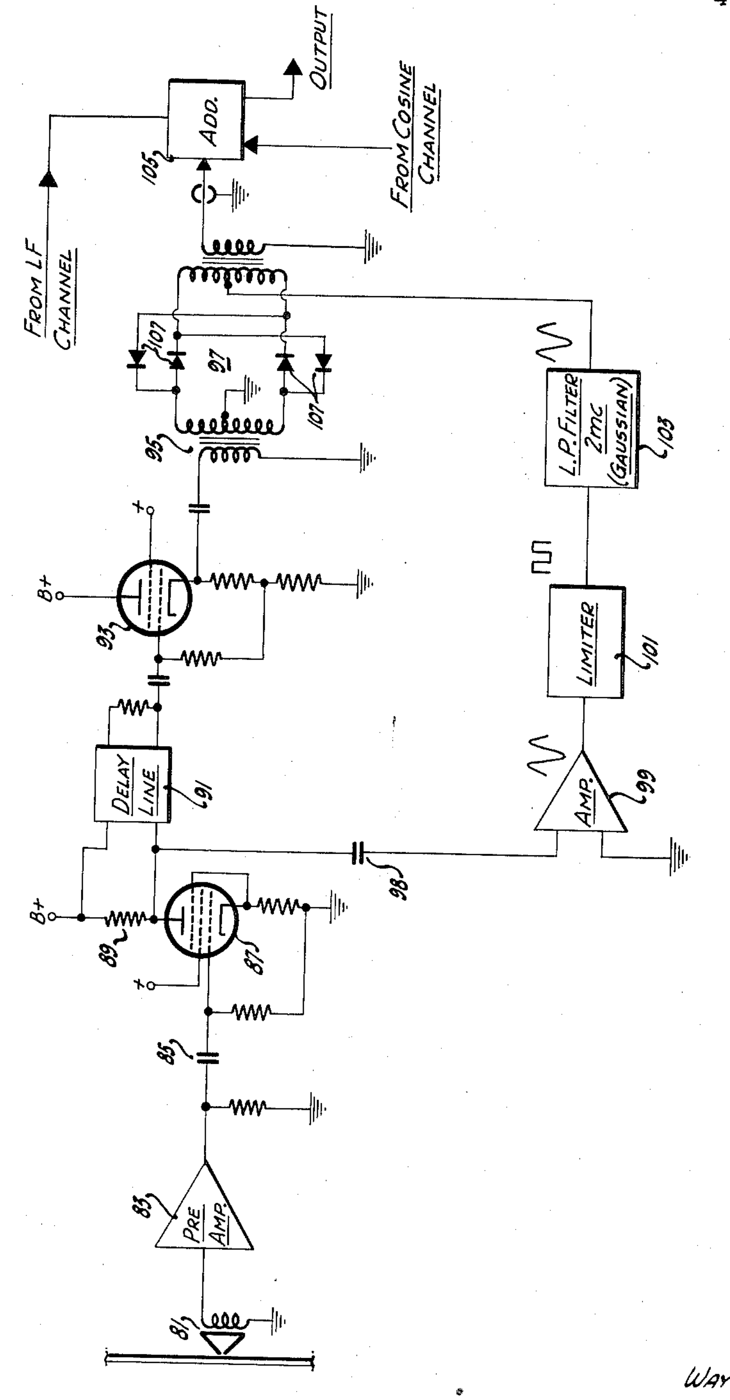
Fig. 2 is a similar diagram of the circuitry used in reconstituting the "sine" component of the signals reproduced from tracks recorded through the use of the equipment of Fig. 1, equipment used in reconstituting the "cosine" components being identical.

Fig. 2 illustrates the equipment embodied in one reproducing channel, for reconstituting channels recorded with apparatus illustrated in Fig. 1. This equipment may be considered to be that for reproducing signals recorded on the sine channel of Fig. 1, by the recording head $66_1$. The recorded signal is picked up from the moving tape 79 by a transducer head 81, and after having been increased in amplitude by a preamplifier 83, is supplied, through a blocking condenser 85 to the grid of an amplifying tube 87, illustrated as a pentode. The amplified signal from this tube is taken off across an anode resistor 89. From this point the circuit divides. One half of the signal goes to a delay line 91, and thence to the grid of a cathode-follower tube 93, connected to supply the input transformer 95 of a double-balanced modulator 97.

The other input to the modulator 97 is supplied with signals derived from the other branch circuit connected across the output of tube 87. This second branch line from the anode of tube 87 connects through a blocking condenser to the input of a high gain amplifier 99, the output of which connects to a limiter 101. The limiter converts the variable-amplitude, variable-frequency output of amplifier 99 to substantially rectangular waveform signals of constant amplitude but variable frequency, the latter being dependent upon frequency of the signals reproduced.

The rectangular pulses are next passed through a low-pass Gaussian filter 103, having a 2 mc. cutoff, corresponding to the upper cutoff frequency of the reproducing equipment. This filter rounds off the rectangular waveform pulses from the limiter, giving the output waves from it a substantially sinusoidal waveform; i.e., instead of a substantially vertical rise, representing components of extremely high frequencies, most of the harmonic frequencies are eliminated.

It is this output that supplies the second input circuit of the modulator 97. The latter connects to an adding circuit 105 where it is added to the signals from the low frequency and cosine channels.

The rectifiers 107 which do the switching in modulator 97 are preferably contact rectifiers of the square-law type. It can be shown that where such rectifiers are used, with switching or modulating pulses of the substantially sine-waveform here employed, the rise time of the output signals is effectively cut in half. The output represents the product (A sin $\omega t$) (B sin $\omega t$), where A is a constant and B is proportional to the input amplitude, resulting in waves whose major alternating component is proportional to B sin $2\omega t$.

It is possible to substitute a simple full-wave rectifier for the modulator 97 and the branch circuit which supplies the modulating pulses. The principal frequencies of the signals originally operated upon will be restored by the simpler arrangement, but the amplitudes will be proportional to $B^2$ instead of B. The approximate restoration of the original signal so produced is usable but not as satisfactory as with the preferred arrangement for this type of signal. Either the modulator or the full wave rectifier arrangement is in effect, a frequency doubler; it is this function that is important rather than the form of apparatus used; other types of doubler could be employed but less conveniently.

Whether the double-balanced modulator or the full-wave rectifier is used, the principal products in the output will be a D.C. component and a component of double the frequency of the recorded waves, again using the term "frequency" in the sense explained above. The D.C. component is, of course, removed in the output transformer of the modulator 97; if a full wave rectifier is used instead of the modulator the D.C. can be removed by a blocking condenser. The higher order modulation products of the operation are outside of the 4 mc. television band, and are removed from the signals by the sideband filters, normally included in all television transmitters in order that they may comply with the applicable standards of transmission.

Fig. 4 shows the waveforms resulting from the successive steps performed by the reproducing equipment on the signals illustrated in Fig. 3. In this figure the sine channel waveforms are shown in solid lines and are designated by reference characters carrying the subscript 1 while the cosine channel waveforms are dotted and distinguished by the subscript 2.

In Fig. 4, curves 107 indicate the waveforms reproduced from the recording of waveforms similar to curve 76 of Fig. 3. After amplification and limiting these signals appear in the output of limiter 101 as shown in curves 109, and the low-pass filter 103 converts the waveform 109 into the form indicated in curves 111, wherein the waveforms are substantially sinusoidal.

The output of modulator 97 is the product of curves 107 and 111, the resultant waveform being indicated by curves 113. Combined in the adding circuit 106, the result is a curve of the shape indicated by the dashed curve 115, which, it will be seen, is essentially the same waveform as curve 70, representing the high frequency components first operated upon.

Fig. 4*a* shows the waveforms developed in reproducing the continuous wave, whose recording is shown in Fig.

3a. As in the case of the high frequency components of a square waveform the addition in proper phase, of the sine and cosine channel outputs results in the reconstruction of substantially the original waveform.

It will be apparent that since the system of this invention effects its separation of the original signal into two bands by selecting the positive and negative halves of the waves which are to be recorded, it is not applicable to systems wherein the direct current component is transmitted, nor will it transmit high frequency signals superposed on low frequency signals of greater amplitude. Therefore, for the transmission of amplitude-modulated television signals, the removal of the low frequency component before applying the frequency-shifting operation is usually a necessity, although it may not be so in certain special applications.

The invention is not limited to television signals. It can be applied wherever a wide band of frequencies is to be recorded or reproduced and its application is not dependent upon the particular form of apparatus shown. No limitations upon the scope of the invention are intended except those specifically set forth in the following claims.

I claim:

1. Apparatus for recording on a movable medium and for reproducing from said medium wideband information signals including signals of higher frequency than the cutoff frequency of the reproducing apparatus, including, means responsive to the information signals for deriving from the information signals a plurality of separate wave trains representative, respectively, of the portions of said information signals within particular amplitude ranges distinct from one another; means coupled to said deriving means for separately recording on the movable medium the wave trains produced by said deriving means; means coupled to said movable medium for reproducing the information recorded by said recording means; means coupled to said reproducing means for increasing by a particular multiple the frequency of the reproduced signals and for increasing the frequency of the reproduced signals by a multiple related to the number of wave trains in the plurality; and means responsive to the signals of increased frequency for combining the signals produced by said frequency increasing means to reproduce substantially the original signals.

2. Apparatus for recording and reproducing wideband alternating current signals including signals of higher frequency than the cutoff frequency of the reproducing apparatus used, including, means for developing from the signals to be reproduced two wave trains representing respectively the positive and negative half cycles of said signals; means coupled to said developing means for separately recording the wave trains produced by said developing means as separate tracks on a moving medium; means coupled to the moving medium for playing back the wave trains recorded thereon by said separately recording means; means coupled to said playing back means for deriving from each of the wave trains a train of waves of uniform amplitude alternating in polarity simultaneously with the alternations of the respective played back waves; means coupled to said playing back means and to said deriving means for modulating said trains of waves produced by said deriving means and by said playing back means to produce two wave trains of developed frequency of the played back wave trains; and means coupled to said intermodulating means for combining the wave trains produced by said intermodulating means to reproduce substantially the original wave train.

3. Apparatus for recording and reproducing wideband alternating current signals including signals of higher frequency than the cutoff frequency of the reproducing apparatus used, including, means for developing from the signals to be reproduced two trains of pulses alternating in sign, the pulses of one of said trains coinciding with signals of one polarity of the signals to be reproduced and the pulses of the other of said trains coinciding with signals of opposite polarity of the signals to be reproduced; means coupled to said developing means for sampling the signal to be reproduced with each of said trains of pulses to produce trains of pulses of alternating polarity and varying amplitude; means coupled to said sampling means for recording the trains of pulses of alternating polarity and varying amplitude produced by said sampling means as separate tracks on a moving recording medium; means coupled to the moving recording medium for playing back the recorded trains of pulses of alternating polarity and varying amplitude; means coupled to said playing back means for doubling the frequency of the waves in each of the wave trains produced by said playing back means; and means coupled to said doubling frequency means for combining the double frequency waves produced by said doubling frequency means to reconstitute substantially the original signal.

4. Apparatus for dividing a wide band of information signals into restricted bands including means responsive to the amplitude of the information signals for separating the portions of the signals above a particular amplitude from the portions of the signals below the particular amplitude to produce a pair of wave trains representative of different portions of the information signals; means coupled to said separating means for effectively inverting alternate portions of each of the two wave trains developed by said separating means; and means coupled to said inverting means for removing from each of the signals from said inverting means frequency components above the restricted band.

5. Apparatus for recording and reproducing wide band information signals including signals of higher frequency than the cutoff frequency of the reproducing apparatus, including, means responsive to the information signals for developing from the signals to be reproduced two trains of pulses alternating in polarity and for producing one train of such pulses in accordance with the occurrence of information signals above a particular amplitude and for producing the other of said pulse trains in accordance with the occurrence of information signals below the particular amplitude; means coupled to said developing means for amplifying and limiting the pulses in each of said wave trains from said developing means to produce trains of pulses of the same periods and of substantially rectangular wave form as the pulses of said wave trains from said developing means; means coupled to said amplifying and limiting means for developing from each of the trains of rectangular pulses developed by said amplifying and limiting means a train of rectangular waves changing in polarity with alternate changes of polarity of the waves developed by said amplifying and limiting means; means coupled to said last-mentioned means for differentiating the rectangular waveforms developed by said last-mentioned means to produce two trains of short pulses of alternating polarity and coinciding in time with the pulses developed by said first-mentioned developing means; means coupled to said differentiating means for intermodulating the pulses developed by said differentiating means with the signals to be reproduced to sample the latter signals and produce therefrom trains of pulses alternating in polarity; means coupled to said intermodulating means for recording the trains of pulses developed by said intermodulating means as separate tracks on a moving medium; means coupled to said moving medium for playing back the information recorded by said recording means to produce two new wave trains; means coupled to said playing back means for doubling the frequency of the wave trains produced by said playing back means; and means coupled to said frequency doubling means for adding the wave trains produced by said frequency doubling means to substantially reconstitute the original signal.

6. Apparatus for recording and reproducing components of wide-band information signals which are higher in frequency than the upper cutoff frequency of the reproducing apparatus, including, means responsive to the information signals for deriving from the higher-frequency components of said wide band signals a train of pulses reversing in polarity at alternate reversals of polarity of said higher frequency components; means coupled to said deriving means for intermodulating said high frequency components of said information signals with said train of pulses from said deriving means; means coupled to said intermodulating means for recording the modulation products from said intermodulating means; means responsive to the recorded modulated products for reproducing the recorded modulation products; means coupled to said reproducing means for deriving from said reproduced modulated products a train of pulses reversing in polarity with each reversal of polarity of said modulated products; and means coupled to said last-mentioned means for intermodulating said reproduced modulated products with the train of pulses derived from said reproducing means to reproduce the frequencies of said band of higher frequency components.

7. Apparatus for dividing an information signal into a plurality of bands each being a particular sub-multiple of the band width of the original signal and conjointly carrying the information carried by said original band, including, means responsive to the information signal for deriving from said information signal a plurality of trains of pulses in which the pulses in each train reverse in polarity at alternate reversals in amplitude of said information signal relative to a particular amplitude level and in which the trains of pulses have a particular phase relationship to one another; means coupled to said deriving means for intermodulating said original band simultaneously with each of said trains of pulses to produce resultant bands of signals having the particular phase relationship with respect to one another; and means coupled to said intermodulating means for passing in each of said resultant bands the frequency components having a band only within the particular sub-multiple of the band width of the information signal.

8. In a system for recording and reproducing wide-band alternating current signals which include signal frequencies above the cutoff frequency of the recording and reproducing apparatus, frequency discriminating means for separating the signal frequencies of the wide-band signals which are above the cutoff frequency of the recording and reproducing apparatus from the signal frequencies of the wide-band signals which are below the cutoff frequency of the recording and reproducing apparatus, means coupled to said frequency discriminating means for deriving from the separated signal frequencies above the cutoff frequency of the recording and reproducing apparatus two trains of pulses each reversing in polarity at alternate reversals of polarity of said separated signal frequencies above the cutoff frequency of the recording and reproducing apparatus, means coupled to said deriving means and to said frequency discriminating means for intermodulating said separated signal frequencies above the cutoff frequency of the recording and reproducing apparatus with each of said two trains of pulses to produce two resultant bands of signals which together carry the information carried by said separated signal frequencies, and means coupled to said intermodulating means for introducing said two resultant bands of signals to the recording and reproducing apparatus so that the double frequency components of said resultant bands which result from the intermodulation are attenuated by the recording and reproducing apparatus.

9. In a system for recording and reproducing information signals occupying a frequency band above the cutoff frequency of the apparatus utilized for recording and reproducing the signals; means responsive to the information signals for providing a first signal corresponding to the portions of the information signal above a particular amplitude level and for providing a second signal corresponding to the portions of the signals to be recorded below the particular amplitude level and for introducing the first and second signals to the recording and reproducing apparatus for recording by the apparatus; means coupled to the recording and reproducing apparatus and responsive to the reproduced first and second signals for increasing the frequencies of said reproduced first and said second signals by a particular amount; and means coupled to said frequency-increasing means for combining the first and second signals of increased frequency to obtain a reproduction of the information signals.

10. In a system for recording and reproducing wide-band signals which include signal frequencies above the cutoff frequency of the recording and reproducing apparatus; frequency discriminating means for separating the signal frequencies of the wide-band signals which are above the cutoff frequency of the recording and reproducing apparatus from the signal frequencies of the wide-band signals which are below the cutoff frequency of the recording and reproducing apparatus; means coupled to said frequency discriminating means for deriving from the separated signal frequencies above the cutoff frequency of the recording and reproducing apparatus at least two trains of pulses in which the pulses in each train reverse in polarity at alternate reversals of polarity of said separated signal frequencies relative to a particular amplitude level, means coupled to said deriving means and to said frequency-discriminating means for intermodulating said separated signal frequencies above the cutoff frequency of the recording and reproducing apparatus with each of said two trains of pulses to obtain a recording by the equipment of two resultant bands of signals which together carry the information carried by said separated signal frequencies and which have ranges of frequencies half of the range of the separated signal frequencies; means coupled to the recording and reproducing apparatus for reproducing the recorded signals to double the frequencies of the reproduced half frequency components of said resultant bands which result from the intermodulation; and means coupled to said doubling means for combining the doubled frequency signals to form a signal which is substantially the same as said separated signal frequencies above the cutoff frequency of the recording and reproducing apparatus.

11. In a system for recording and reproducing signals occupying a frequency band above the cutoff frequency of the signal recording and reproducing apparatus; means for receiving input signals occupying a frequency band above the cutoff frequency of the signal recording and reproducing apparatus; means coupled to the receiving means for developing a plurality of signals each having frequencies that are sub-multiples of the frequencies of the input signals for introduction to the recording and reproducing apaparatus; means coupled to the recording and reproducing apparatus for developing a plurality of signals having frequencies that are multiples of the frequencies of the reproduced plurality of signals with said plurality of reproduced signals being related individually to said plurality of signals introduced to said recording and reproducing apparatus; and means coupled to said multiple frequency developing means for combining the plurality of multipled frequency signals to reproduce substantially the original input signals.

12. In a system for recording and reproducing wide-band signals which include signal frequencies above the cutoff frequency of the recording and reproducing apparatus; means responsive to the wide-band signals for introducing said wide-band signals as one channel of information to the recording and reproducing apparatus wherein the signal frequencies of said wide-band signals above the cutoff frequency of the recording and reproducing apparatus are attenuated; frequency discriminating means for separating the signal frequencies of said wide-band signals which are above the cutoff frequency of the recording and reproducing apparatus from the rest of the signal frequencies of said wide-band signals; means coupled to said frequency discriminating means for dividing the frequency of the separated signal frequencies and introducing the divided signal frequencies as two channels of information to the recording and reproducing apparatus; means coupled to the recording and reproducing apparatus for doubling the reproduced divided signal frequencies of said two channels; and means coupled to said doubling means and to said recording and reproducing means for combining the doubled signal frequencies with each other and with the reproduced signal frequencies of said wide signals below the cutoff frequency of the recording and reproducing apparatus of said one channel to form output signals which are substantially the same as said wide-band signals.

13. In a system for recording and reproducing wide-band signals covering a frequency band greater than the reproducing range of the equipment utilized to record and reproduce the signals; means responsive to the wide-band signal for supplying the wide-band signal to the recording and reproducing equipment for recording by the equipment of the signal components in a first particular range of frequencies; means responsive to the wide-band signal for separating the signal components of the wide-band signal in a second particular range of signals from the signal components in the first particular range of frequencies; means coupled to said separating means for deriving from the signal components in the second particular range a plurality of bands of signal frequencies each having a frequency range which is a particular sub-multiple of the second particular range, the particular sub-multiple being directly related to the number of bands in the plurality; means coupled to said deriving means for supplying said plurality of bands of signal frequencies to the recording and reproducing equipment for recording of the signals; and means coupled to the recording and reproducing equipment and responsive to the signals reproduced by the equipment for combining the reproduced plurality of bands of signal frequencies with the signal components reproduced in the first particular range of frequency means to form composite signals corresponding to said wide-band signals.

14. In a system for recording wide-band signals having signal frequencies above the cutoff frequency of the recording and reproducing equipment; means responsive to said wide-band signals for deriving from said wide-band signals a plurality of trains of pulses in which the pulses in each train reverse in polarity at alternate reversals of polarity of said wide-band signals relative to a particular amplitude level; means coupled to said deriving means for intermodulating said wide-band signals with said trains of pulses to produce a plurality of bands of intermodulation signals each having a frequency range which is a particular sub-multiple of the range of the wide-band signals; and means coupled to said intermodulating means for introducing said intermodulation signal components to the recording equipment for recording by the equipment in discrete tracks.

15. In a system for recording signals occupying a frequency band above the cutoff frequency of the signal recording apparatus; means for receiving input signals occupying a frequency band above the cutoff frequency of the signal recording apparatus; means coupled to said receiving means for separating said input signals into a plurality of channels each corresponding to a portion of the input signals; means coupled to said separating means for developing for each of the channels a signal having frequencies that are a particular sub-multiple of the frequencies of the signals separated into the plurality of channels; and means coupled to said developing means for introducing the plurality of channels of sub-multiple frequency signals to the recording apparatus.

16. In combination for use with apparatus for recording in a plurality of channels signals representing different portions of an information signal and having frequency ranges which are a particular sub-multiple of the range of frequencies of the information signal; means responsive to the signals recorded in the different channels for reproducing such signals; means responsive to the signals reproduced from the different channels for increasing the frequencies of the reproduced signal by a multiple corresponding to the ratio between the sub-multiple frequency range and the range of frequencies of the information signal; and means responsive to the reproduced signals of increased frequencies for combining these signals to reproduce the information signal.

17. In combination for use with apparatus for recording in a plurality of channels signals representing portions of an information signal within different amplitude ranges and having frequency ranges which are a particular sub-multiple of the range of frequencies of the information signal; means responsive to the signals recorded in the different channels for reproducing such signals; means responsive to the signals reproduced from each channel for inverting particular portions of such signals at a rate inversely related to the particular sub-multiple; and means responsive to the inverted signals from the different channels for combining such signals to reproduce the information signal.

18. Apparatus for recording signals occupying a frequency band above the cutoff frequency of the apparatus used comprising an input circuit for the signals to be recorded, a first branch circuit connected to said input circuit for receiving the signals to be recorded, a double-balanced modulator having two input terminals and providing for a modulated output when said two input tereminals simultaneously receive signals, means connecting one of said input terminals to said first branch circuit for coupling the signals to be recorded to said modulator, a second branch circuit connected to said input circuit for receiving the signals to be recorded, a pair of rectifiers in said second branch circuit for separating portions of the signals to be recorded of opposite polarity, means coupled to each of said pair of rectifiers for producing from the rectified signals therefrom waves of like period and substantially rectangular waveform, a frequency divider coupled to each of said producing means for developing from the rectangular waveforms a train of substantially rectangular waves alternating in polarity with every alternate change in polarity of the waves developed by said producing means, a differentiating circuit connected to each of said frequency dividers to derive from the train of substantially rectangular waves alternating in polarity a succession of sampling pulses of alternating sign, means for introducing the succession of sampling pulses from said differentiating circuit to the other of said input terminals of said double-balanced modulator whereby the signals to be recorded are sampled by said sampling pulses, and a recording head connected to said double-balanced modulator for receiving the modulated signals therefrom due to the modulation of the sampling pulses with the signals to be recorded.

References Cited in the file of this patent

UNITED STATES PATENTS

| | | |
|---|---|---|
| 2,534,627 | Schade | Dec. 19, 1950 |
| 2,698,875 | Greenwood | Jan. 4, 1955 |
| 2,751,437 | Hoeppner | June 19, 1956 |
| 2,762,861 | Somers | Sept. 11, 1956 |
| 2,794,066 | Mullin | May 28, 1957 |
| 2,817,701 | Johnson | Dec. 24, 1957 |
| 2,881,394 | Ernyer | Apr. 7, 1959 |